US011158297B2

(12) United States Patent
Sobierajski et al.

(10) Patent No.: US 11,158,297 B2
(45) Date of Patent: Oct. 26, 2021

(54) TIMBRE CREATION SYSTEM

(71) Applicant: International Business Machines Corporation, Armonk, NY (US)

(72) Inventors: Mark Sobierajski, Pound Ridge, NY (US); Hubertus Franke, Yorktown Heights, NY (US); Felipe Ferraz Telles, Poughkeepsie, NY (US); Rajiv Joshi, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 11 days.

(21) Appl. No.: 16/740,811

(22) Filed: Jan. 13, 2020

(65) Prior Publication Data
US 2021/0217396 A1    Jul. 15, 2021

(51) Int. Cl.
*G10H 7/00*    (2006.01)
*G10H 7/10*    (2006.01)
*G06N 3/08*    (2006.01)
*G06N 3/04*    (2006.01)
*G10H 1/00*    (2006.01)
*G10H 1/06*    (2006.01)
*G06F 17/14*   (2006.01)

(52) U.S. Cl.
CPC ........... *G10H 7/105* (2013.01); *G06F 17/142* (2013.01); *G06N 3/0454* (2013.01); *G06N 3/08* (2013.01); *G10H 1/0008* (2013.01); *G10H 1/06* (2013.01); *G10H 2210/066* (2013.01)

(58) Field of Classification Search
CPC ........... G10H 2240/056; G10H 1/0041; G10H 1/0066; G10H 2210/031; G10H 7/00; G10H 3/125; G10H 1/00; G10H 1/0033; G10H 2240/311; G10H 7/105
See application file for complete search history.

(56) References Cited

U.S. PATENT DOCUMENTS

| 5,808,225 A * | 9/1998 | Corwin ................. G10H 3/125 84/602 |
| 7,406,356 B2 | 7/2008 | Peeters et al. |
| RE47,180 E * | 12/2018 | Nagel ................... G10L 21/038 |
| 2009/0132077 A1* | 5/2009 | Fujihara ............... G06F 16/634 700/94 |
| 2010/0154619 A1 | 6/2010 | Taub et al. |
| 2011/0112670 A1* | 5/2011 | Disch .................... G10L 21/04 700/94 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Marlon T Fletcher
(74) *Attorney, Agent, or Firm* — Peter Edwards, Esq.; McGinn I.P. Law Group, PLLC.

(57) ABSTRACT

A timbre creation method, system, and computer program product include performing a timbre analysis of a sound from an input source to generate a digital fingerprint of the sound, performing deep learning to create a patch that matches the digital fingerprint, and generating a second patch for a synthesizer which reproduces a timbre that complements the digital fingerprint based on the patch.

20 Claims, 6 Drawing Sheets

(56) References Cited

U.S. PATENT DOCUMENTS

| | | | | |
|---|---|---|---|---|
| 2011/0216918 A1* | 9/2011 | Nagel | .................... | G10L 21/038 |
| | | | | 381/98 |
| 2011/0288873 A1* | 11/2011 | Nagel | .................... | G10L 21/038 |
| | | | | 704/500 |
| 2014/0241538 A1* | 8/2014 | Ayres | ........................ | G10H 7/00 |
| | | | | 381/61 |
| 2015/0170663 A1* | 6/2015 | Disch | .................. | G10L 19/0017 |
| | | | | 704/500 |
| 2015/0287417 A1* | 10/2015 | Disch | .................. | G10L 19/0212 |
| | | | | 704/500 |
| 2016/0133240 A1* | 5/2016 | Cartwright | ............ | G10L 13/033 |
| | | | | 84/601 |
| 2017/0110132 A1* | 4/2017 | Disch | .................. | G10L 19/0208 |
| 2020/0143779 A1* | 5/2020 | Xiao | ........................ | G10H 1/366 |
| 2020/0258490 A1* | 8/2020 | Liu | ........................ | G10H 5/007 |

OTHER PUBLICATIONS

N. Misdariis et al., http://architexte.ircam.fr/textes/Misdariis98a/index.pdf, published as N. "Validation of a Multidimensional Distance Model for Perceptual Dissimilarities among Musical Timbres", Proc. of the 16th Int. Congress on Acoustics and the 135th Meeting of the Acoustical Society of America, Seattle, Washington, Jun. 20-26, 1998, accessed Sep. 5, 2019.

"10 Musical Instruments that Sound Great with your Guitar" https://guitarcoachmag.com/blog/10-musical-instruments-sound-great-guitar/, published Mar. 19, 2018, 7 pages, accessed Sep. 5, 2019, 7:31:09 AM EST.

* cited by examiner

100

TIMBRE CREATION SYSTEM

BACKGROUND

The present invention relates generally to a timbre creation method, and more particularly, but not by way of limitation, to a system, method, and computer program product for using a timbre fingerprint generated from a given input sound as a reference to create a patch for a given synthesizer to recreate this timbre by using the created patch and the given synthesizer.

Conventionally, one may want to choose another instrument to add at any point during the process of creating a song. It may take hours to figure out how to recreate the sound from scratch, if the creator has an existing waveform of the instrument playing one note or just a target sound of any instrument and one has a given synthesizer.

Today, most people make a sound that is time consuming, hire session musicians or voice actors to record a set of samples, buy a library pack or sample pack and use those, buy a preset pack which has some sounds one likes that one can then alter to come up with something similar but unique, etc. However, these solutions are both time consuming and costly.

SUMMARY

In view of the problems in the art, the inventors have considered a new improved technique to provide an analysis to apply a sequence of timbre analysis filters and extractors that ultimately create a basic digital fingerprint of the timbre and generate, based on this digital fingerprint, new tones from different instruments that "match" the provided digital fingerprint and therefore provide acoustic harmony.

In an exemplary embodiment, the present invention provides a computer-implemented timbre creation method, the method including performing a timbre analysis of a musical instrument sound from a musical instrument to generate a digital fingerprint of the musical instrument, determining a target musical instrument having timbres that complement the digital fingerprint, and generating a patch for a musical synthesizer which reproduces the timbres that complement the digital fingerprint.

In another exemplary embodiment, the present invention provides a computer program product, the computer program product comprising a computer-readable storage medium having program instructions embodied therewith, the program instructions executable by a computer to cause the computer to perform: performing a timbre analysis of a sound from an input source to generate a digital fingerprint of the sound, performing deep learning to create a patch that matches the digital fingerprint, and generating a second patch for a synthesizer which reproduces a timbre that complements the digital fingerprint based on the patch.

In another exemplary embodiment, the present invention provides a timbre creation system, the system including a processor; and a memory, the memory storing instructions to cause the processor to perform: performing a timbre analysis of a sound from an input source to generate a digital fingerprint of the sound, performing deep learning to create a patch that matches the digital fingerprint, and generating a second patch for a synthesizer which reproduces a timbre that complements the digital fingerprint based on the patch.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
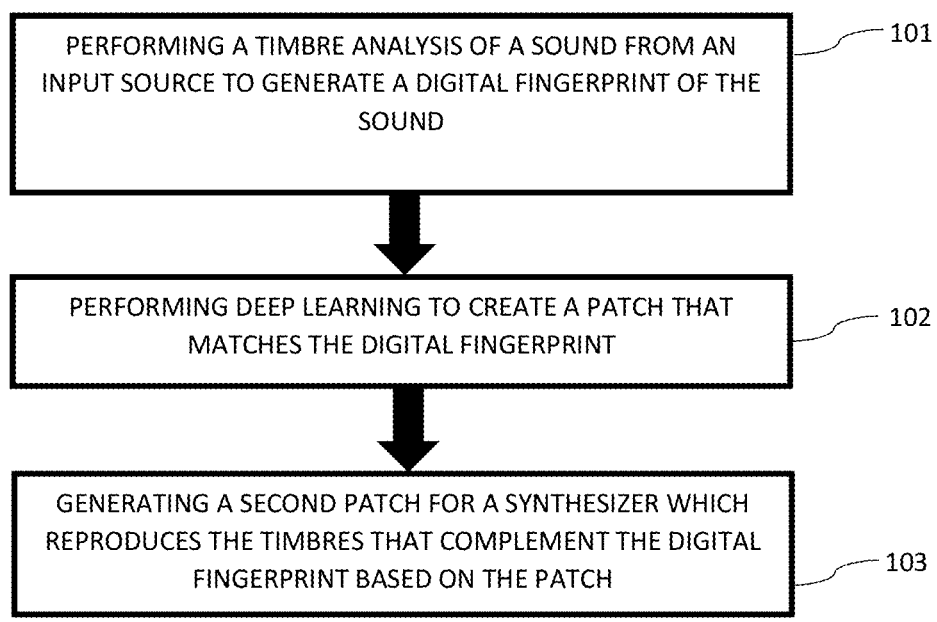
FIG. 1 exemplarily shows a high-level flow chart for a timbre creation method 100 according to an embodiment of the present invention.

The invention will now be described with reference to FIGS. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a timbre creation method 100 according to the present invention can include various steps for timbre creation based on a provided sound.

Figure 4:
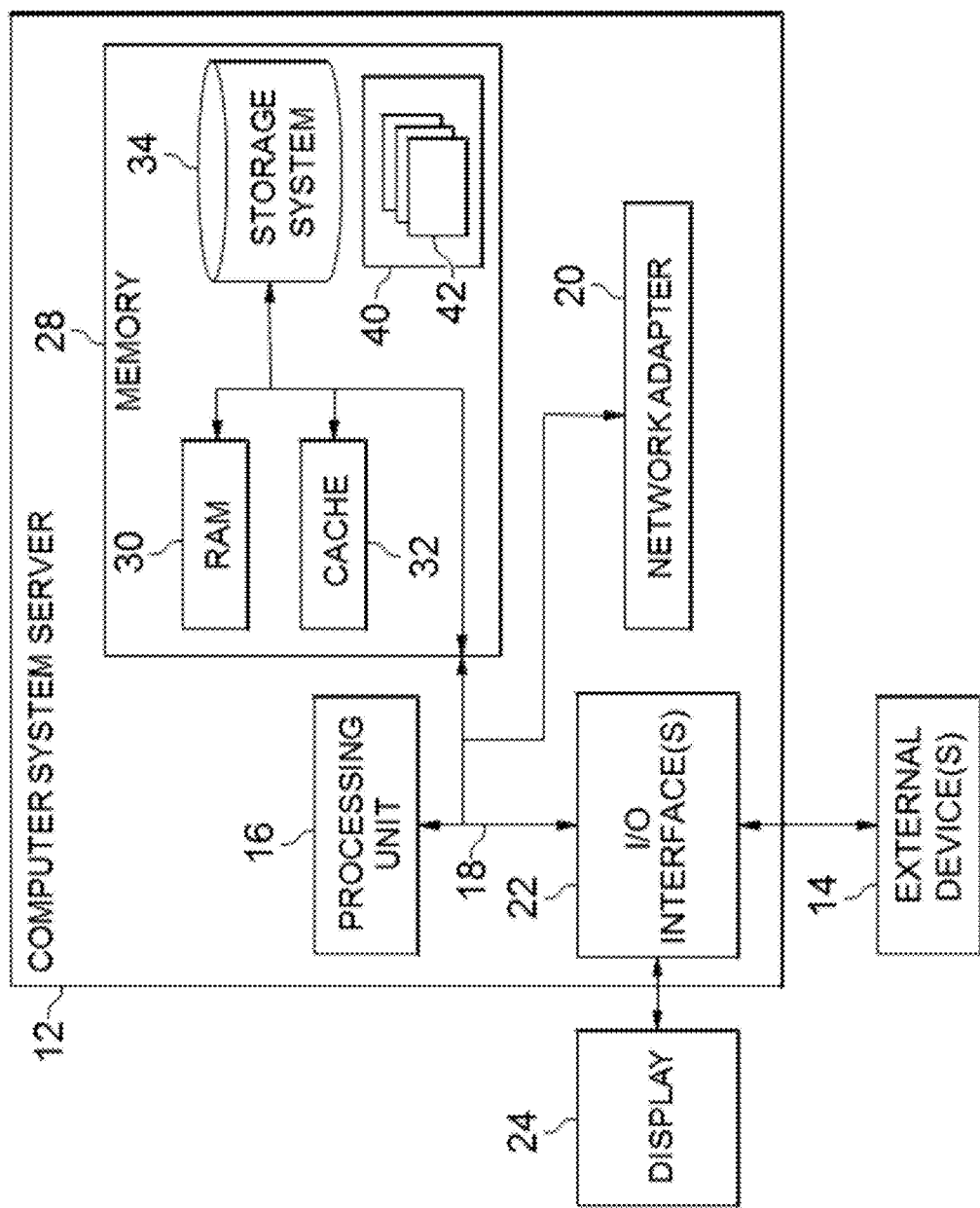
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 6), it is nonetheless understood that the present invention can be implemented outside of the cloud environment.

It is noted that although the discussion below is in reference to a musical instrument, the invention more generally relates to sound reproduction and multiple patches for different types of sounds (e.g., voice generation, sound track scoring, etc.).

With reference generally to FIG. 1, in step 101, a timbre analysis of a sound from an input source is performed to generate a digital fingerprint of the sound. For example, the sound can be from a musical instrument, a voice, etc. This is done by analysis of the primary parts of a sound. The primary parts of a sound describe the characteristics of a tone at generation. Generation of a tone is usually done via a VCO (Voltage-Controlled Oscillator), but could also be a guitar or piano or human voice (i.e., all of these latter methods oscillate physical things where in a computer it is usually a digital representation of the analog VCO circuit). These characteristics include the fundamental tone, a series of overtones the envelope of which includes the ADSR (Attack Decay Sustain Release) of the sound and the waveform being oscillated unit. If there is more than one fundamental tone oscillating, then this would be expected to be picked up from analysis. This would be considered the Core Timber Analysis.

In this stage of the invention, all post-generation effects are also analyzed and deduced, thereby creating the Fine Timbre Analysis. Post-generation effects are usually software programs or algorithms, which effect and mutate the audio generated by oscillation to alter the sound in specific ways including but not limited to reverb, equalization, distortion, filters, vocoding etc.

Combining the results of the Core Timbre Analysis with the Fine Timbre Analysis should give a specific General Timbre Fingerprint. This fingerprint will be a set of values for a given synthesizer, which produces a sound as close as possible to the target sound based of analysis.

To perform this step, the invention would require a deep learning model that is trained to recognize and isolate these primary properties/characteristics of the sound and output a precise set of values. These values are simple. For example, the fundamental includes a Hz frequency representing a pitch. The deep learning is necessary for discovering post-generation effects and helping aid in discovering how many fundamental tones are playing. In some software synthesizers, one can have up to four oscillators all generating tones which could make this harder for regular algorithms not using deep learning unlike fundamental and overtone series and envelope are all pretty straight forward and could be detected with basic algorithmic analysis. The human voice can only play one note at a time so these would be easier. These values are then converted to a basic synthesizer patch from which step 102 will start. The result of step 101 is an approximation, but should be a good starting patch.

In step 102, deep learning is performed to tune the synthesizer patch to match the output sound to the target sound. That is, deep learning is performed to converge on a waveform (i.e., a patch), envelope and post-generation effects, which would make up the synthesizer patch as a whole. This set of values causes the synthesizer to output a sound closer and closer to the input sound.

In step 102, the convergence is performed by starting with the patch generated using the General Timbre Fingerprint data and setting up the oscillators for each fundamental. Step 102 makes sure that each oscillator is using the correct Base Timbre waveform and then the invention applies the envelope to the synthesizer, which is usually global. The invention also applies any filters or effects that would have detected and included in the Fine Timbre Analysis.

For this step, the invention utilizes two neural networks:

Neural Network 1=>Base Timbre Manipulator: This has learned how to edit an actual waveform and control the outputting Fast Fourier Transformation (FFT) (or other algorithm). This will be trained by receiving inputs of the actual waveform and its resulting FFT. Thus, every time it edits the waveform, it will see how it affected the FFT and learn how to make big changes and even slight changes to the FFT and total set of overtones via manipulated the values of the waveform Neural Network 2=>Fine Timbre Manipulator: This is the same as the Neural Network 1 but it looks and plays with almost every other parameter and effect on a synthesizer except the global envelope and waveform. Neural Network 2 will be trained by accepting two inputs, the values of sets of parameters from active effects and the results of the changes it creates in the FFT. Once these two neural nets have converged on values that output a sound exactly like the one it received, it will pass this patch onto the next step.

And, in step 103, the invention uses the patch generated at the end of step 102 which lets the synthesizer reproduce the exact timbre that complements the digital fingerprint of the input target timbre to create thousands of other patches that have x amount of whitespace (distance) from the input; target sounds' timbre. These patches let the synthesizer reproduce sounds with similar timbre, but not an exact match. This step will also use a deep learning model that is trained to create patches that are guaranteed to be similar within a certain amount of variation/whitespace/distance from the original input/target sound. This step uses similar models of being able to compare outputted sounds from the given synthesizer to the target sound and make adjustments accordingly. The difference is that here the adjustments are purposely made to increment away from the target patch generated via step 102. Step 102 is converging on an exact match, while step 103 diverges from this but only by an allowable distance, which could be set as arguments, passed into the system.

It is noted that a patch is a set of values where each value maps to a parameter of a given synthesizer. In addition, a synthesizer is a software program that has a set of parameters, which effect the output of the program. This output is an audio stream or tone and it is a digital byte stream that is then sent to an audio interface which is then converted from a digital byte stream to an analog signal and then sent to speakers where the electrical signal is converted (e.g., transduced) to acoustical sound.

Figure 2:
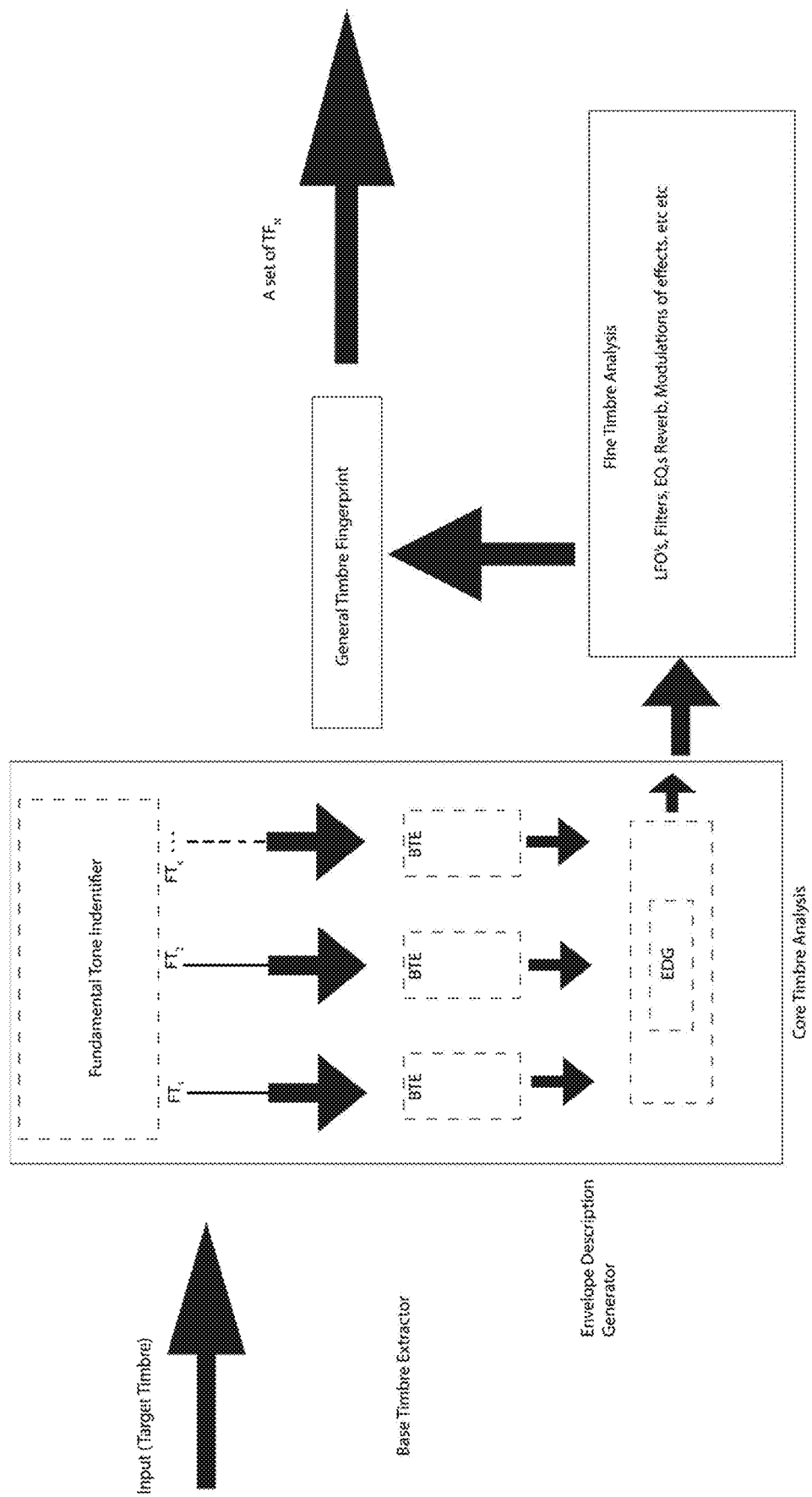
FIG. 2 exemplarily depicts a flow of the analysis of timbre according to an embodiment of the present invention.
Figure 3:
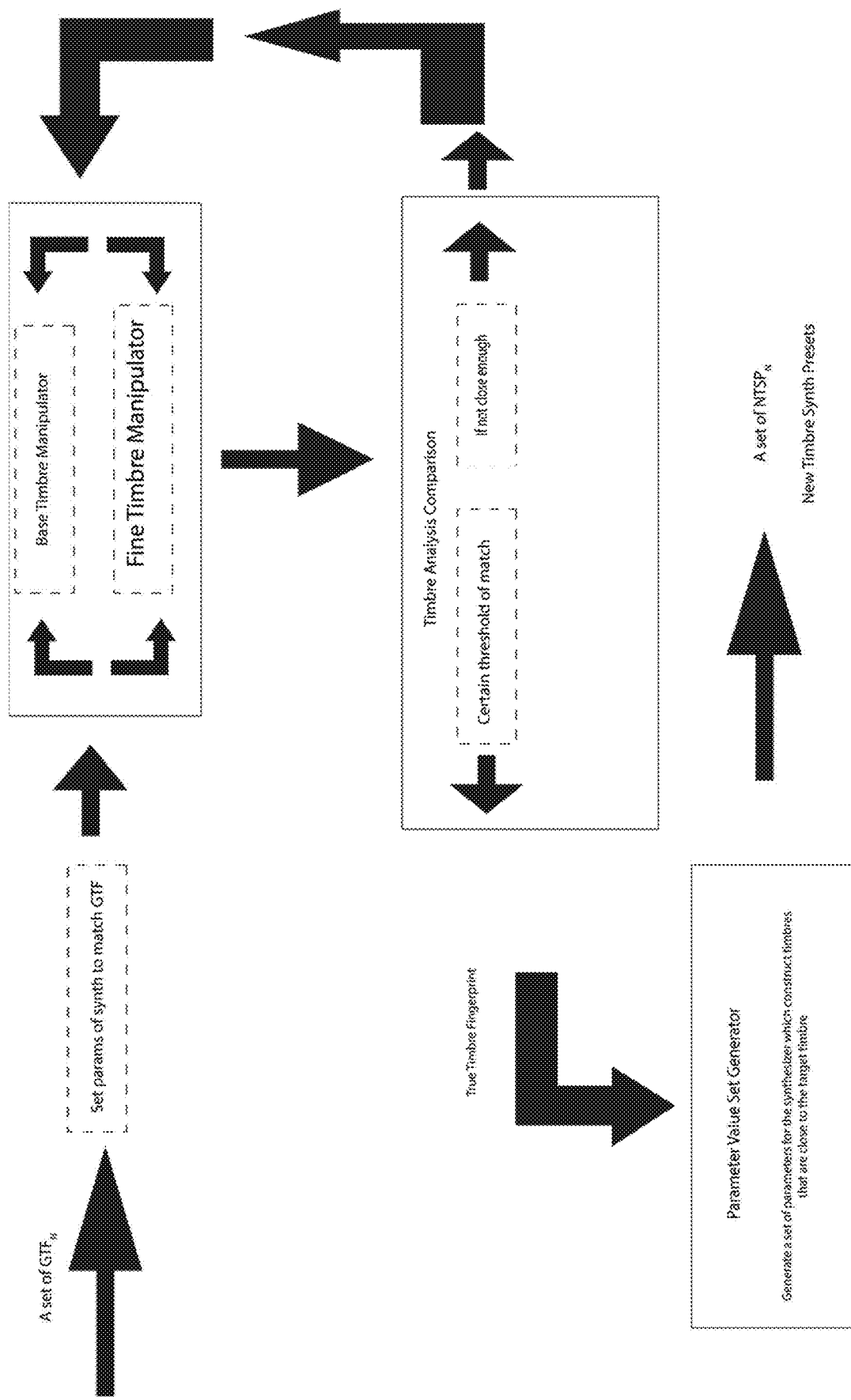
FIG. 3 exemplarily depicts the generation flow for a synthesizer according to an embodiment of the present invention.

The method 100 can be performed in a two-phase approach (i.e., analysis of FIG. 2 and generation of FIG. 3). It is noted that steps 102 and 103 can be performed in parallel from the digital fingerprint of step 101.

With reference to FIG. 2, it is noted that an FTI (Fundamental Tone Identifier) identifies a fundamental tone as the actual pitch being played. The BTE (Base Timbre Extractor) includes extracting a timbre which is defined by the overtone series that is a direct consequence of the fundamental oscillation (i.e., this is why a piano sounds like a piano and a tuba sounds like a tuba).

The EDG (Envelope Description Generator) includes an analysis of the Attack Decay Sustain Release (ADSR) which is an envelope that is applied to the sound to control how (a) fast it comes to amplitude peak and (b) decays away from peak to sustained amplitude. These are characteristics only heard over a period of time.

The FTA (Fine Timbre Analysis) is where other effects to fine tune and surgically take out overtone frequencies happens. This is also where reverb, delay, filters etc. are determined and any automations from other envelopes or LFO's are determined. These are global effects that happen after oscillation generation applied to some or all of the oscillators.

And, GTF (General Timbre Fingerprint) is a concise analysis of the timbre based on key features that make up a sound and what it "looks" like to a computer system. This includes Base Timbre, Fundamental Tones, Envelopes and the timbres fine tuning. This fingerprint can be compared to other fingerprints.

That is, the FTI, BTW, EDG, and FTA are each used in the analysis stage (i.e., step 101) where the analysis applies a sequence of timbre analysis filters and extractors that ultimately create a basic digital fingerprint of the timbre.

During the analysis of step 101 and deep learning of step 102, for the FTI, the invention uses, for example, fast-fourier transformation (FFT) to analyse the audible spectrum of the input wave to determine fundamental tones. Fundamental tones will be the lowest achieved note. If there are "n" (where "n" is an integer greater than 0) fundamental tones, then there will be n sets of overtones in which case the invention will infer what frequencies are fundamentals by using an algorithm to determine which frequencies are actual overtones and which are fundamentals.

Alternatively, during step 101 and the deep learning of step 102, for the FTI, the invention uses a spectral analysis algorithm (e.g., ERBlet Transform).

Next, for the BTE, the invention then uses FFT again to analyse the audible spectrum to determine base timbres for each fundamental tone. This is done by associating each fundamental tone with its unique overtone series.

For EDG, the analysis again uses the FFT on the input wave file. To gain insight on the envelope, one analyses the FFT and compare amplitude to time to infer the ADSR envelope of the sound. A "High Attack" would be gradual or slow rise to peak amplitude, "Low Attack" would be a quick instant rise to full amplitude, "Decay" is how quickly it drops to a sustained amplitude, "Sustain" is the constant volume at which a note can be sustained, and "Release" is how quickly the note fades away to zero. This can all be measured by comparing amplitude to time.

For the FTA, the analysis in step 101 analyses the FFT results to look for any filter sweeps and automation by comparing amplitude to time and overall any movement in the FFT. The invention compares it to Base Timbre's to infer if any frequencies were removed based on one or more of those filters. The invention optionally utilizes a vector-scope to determine the stereo image of this sound and any phasing effects.

After the above phases are applied, the invention has gathered enough data/insights to create a General Timbre Fingerprint (GTF) which will be a basic set of properties that describe a sound close to the target/input. Then, in step 102, a patch is created based on the GTF. And, in step 103, a second patch is created for a synthesizer that complements the first patch (i.e., generation phase as described later and as shown in FIG. 3).

With reference now to FIG. 3, a generation phase is shown for generating a second patch to complement the digital fingerprint.

The BTM (Base Timbre Manipulator) manipulates the Base timbre waveform using available parameters. The TAC (Timbre Analysis Comparison) is a function that can compare two different timbre fingerprints. After the invention creates a timbre, and one may want to see how close one is to the target and thus this is part of an iterative process. The FTM (Fine Timbre Manipulator) includes effects to fine tune and surgically remove or emphasize overtone frequencies. This is also where reverb, delay, filters, etc. are executed and any automations from other envelopes or LFO's are determined. These are global effects that happen after oscillation generation applied to some of the oscillators or all. The TTF (True Timbre Fingerprint) is the fingerprint of the newly generated timbre that is closest to the target. The PVSG (Parameter value set generator) generates a set of NTSP's (New Timbre Synthesizer Pre-set) which is a set of parameters for the given synthesizer that will construct a sound similar to the target.

Step 103 is the generation of synthesizer patches phase. These could be some patches that the deep learning models have come across during step 102 while converging. This would be easy to implement if there is enough white space distance not exceeding the given threshold of being "too dissimilar" during convergence and it could set these patches aside. Otherwise, there would be a deep learning model that has been trained and knows how to alter timbres by manipulating the True Timbre Fingerprint patch enough to generate timbres which alter enough and are not an exact match from the step 102's resulting TTF, This step would require a deep learning model or models similar to those in step 102. However, it would compare the resulting output sound to the FFT (or other algorithm) and simply allow for not an exact match but a certain distance of white space between the input and the actual sound being generated.

In an embodiment for voice generation, the voice is interesting of an 'instrument' as a person can actually change the timbre of their voice themselves via muscles. Since a person's acoustical chamber can change via their muscles and their 'instrument' is actually a wind and string instrument combined, the invention can recreate and mimic several timbres.

Thus, voices are a gradient of timbres across time. For this invention to work here, the invention takes an instantaneous snap shot of several of a person's timbres that occur through natural speech over time across sentences. Typically, each human only has a few types that they naturally use during speech. For example, one could speak a sentence and then take a series of snapshots of timbres at whatever resolution one would desire. Obviously, the greater the resolution, the better a match that the invention could make. However, it would be necessary to capture several of them and then automate the parameters between these patches, which recreate timbral snapshots of the voice. Thus, the invention may mimic the timbre in software; thereby hardware need not be built to get the identical timbre.

The invention would match the timbres at any given point exactly but the invention itself would not automate these parameters to move amongst differences in patches. However, it is possible to capture a single timbre from a voice and turn it into a synthesizer patch. If one were to do this and use this resulting synthesizer with the converged patch as a vocoder, then one could mask his or her voice to sound just like anyone's voice. Indeed, the invention could capture an instantaneous timbre of any human and replicate it with a synthesizer and if one uses it as a carrier synthesizer in the vocoding process, and then one could make a voice to sound like the replicated timbre.

However, since timbres actually vary through speech/time, one would need to create an automation of each parameter to traverse through values to reach other matched patches created in a specific way to truly mimic a live person. This invention may not do this by itself, but this invention would be a major piece in exact replication of a human's gradient timbre across time in natural speech, music generation, movie soundtrack/film score, game soundtracks, commercials, etc.

The invention may or may not do this by itself it depends on the synthesizer and given input file. Depending on the given length of the input file and the given synthesizer are the real bounds to the capabilities of this invention. The True Timbre Fingerprint would include automations over time if it was available on the synthesizer itself. Indeed, some synthesizers won't have automation capabilities or any post-generation effects so in this case one would need to link their states through automation of parameters.

Thus, the invention may isolate a fundamental tone (i.e., the highest amplitude (Hz)) and then analyses the sequence of overtones (timbre) (depends on chamber). The invention then may isolate the envelope and can generate new tones. Moreover, the invention can perform analysis on fundamental overtones to generate a general Timbral Fingerprint. Then, deep learning (machine) can be applied to converge on a waveform (patch) to a set of values/parameters to recreate the target sound. With the invention, generation of (near; i.e., general not identical) timbral tones fingerprints (i.e. new patches) can be achieved.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 4, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
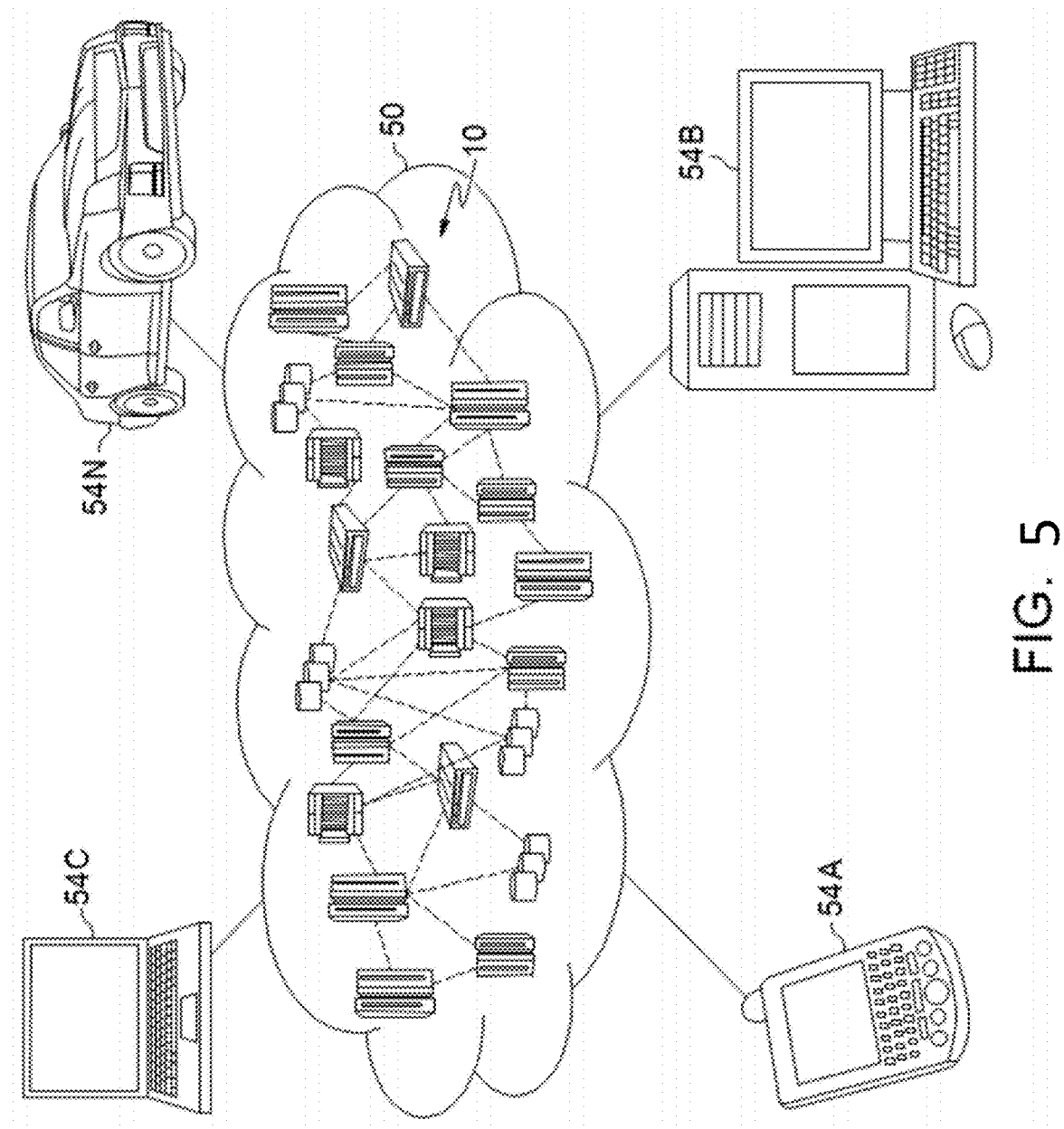
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
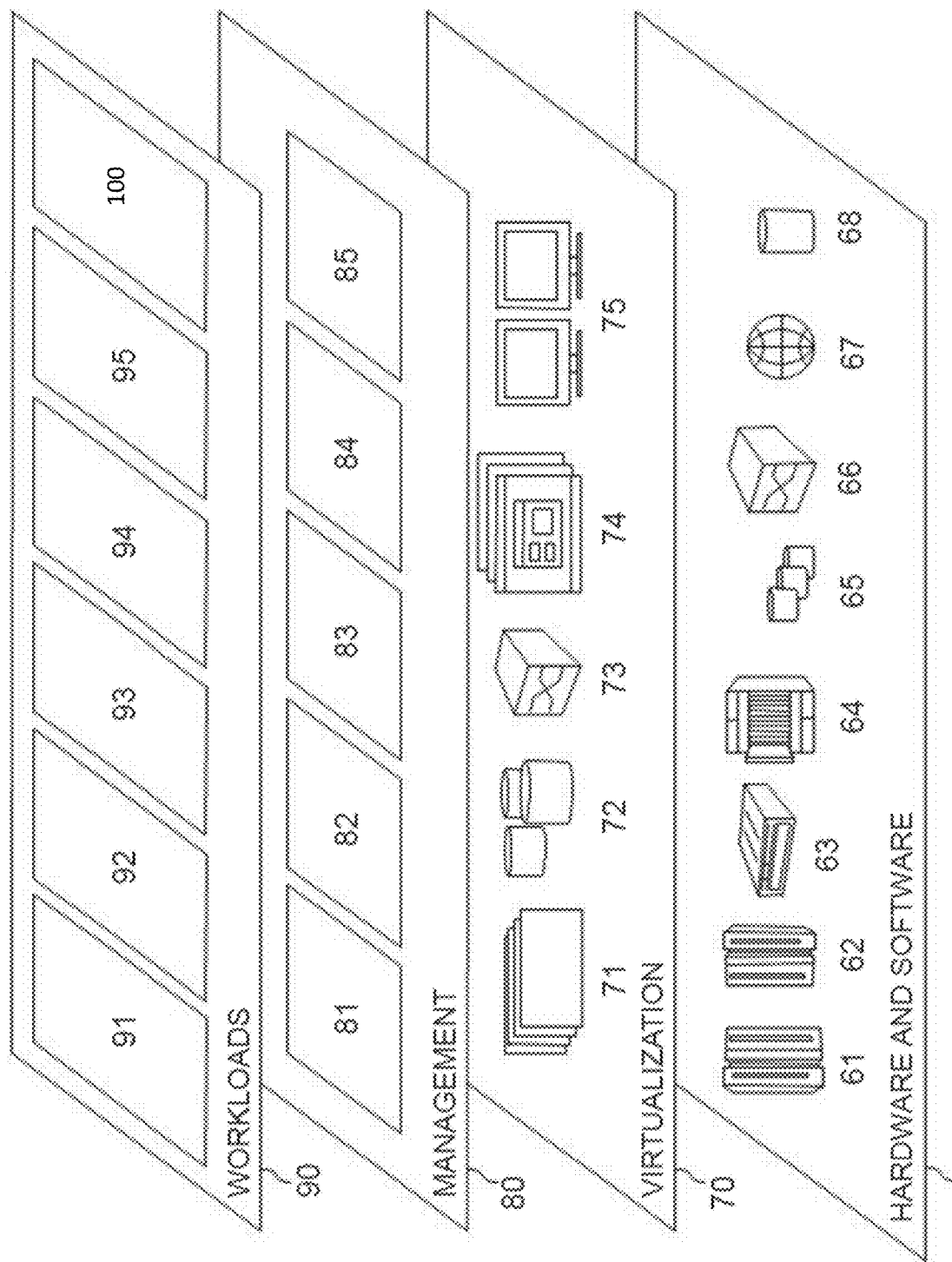
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met, Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and timbre creation method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented timbre creation method, the method comprising:
    performing a timbre analysis of a sound from an input source to generate a digital fingerprint of the sound;
    performing deep learning to create a patch that matches the digital fingerprint; and
    generating a second patch for a second input source for a synthesizer which reproduces a timbre that complements the digital fingerprint based on the patch, the second input source being a different type of input than the input source.

2. The method of claim 1, wherein the timbre analysis further comprises using a fast-fourier transformation (FFT) to analyse an audible spectrum of the sound to determine a fundamental tone.

3. The method of claim 2, wherein the timbre analysis further comprises:
    for a base timbre extraction, using FFT to analyze the audible spectrum to determine a base timbre for each fundamental tone.

4. The method of claim 3, wherein base timbres are determined by associating each fundamental tone with a unique overtone series.

5. The method of claim 3, wherein the timbre analysis further comprises:
    for envelope description generation, using the FFT on the sound to compare amplitude to time to infer an Attack, Decay, Sustain, Release (ADSR) envelope of the sound.

6. The method of claim 5, wherein the timbre analysis further comprises:
    for a fine timbre analysis, analysing a result of the FFT to find a filter sweep and an automation by comparing amplitude to time in the FFT.

7. The method of claim 1, embodied in a cloud-computing environment.

8. A computer program product, the computer program product comprising a computer-readable storage medium having program instructions embodied therewith, the program instructions executable by a computer to cause the computer to perform:
    performing a timbre analysis of a sound from an input source to generate a digital fingerprint of the sound;
    performing deep learning to create a patch that matches the digital fingerprint; and
    generating a second patch for a second input source for a synthesizer which reproduces a timbre that complements the digital fingerprint based on the patch, the second input source being a different type of input than the input source.

9. The computer program product of claim 8, wherein the timbre analysis further comprises using a fast-fourier transformation (FFT) to analyse an audible spectrum of the sound to determine a fundamental tone.

10. The computer program product of claim 9, wherein the timbre analysis further comprises:
    for a base timbre extraction, using FFT to analyze the audible spectrum to determine a base timbre for each fundamental tone.

11. The computer program product of claim 10, wherein base timbres are determined by associating each fundamental tone with a unique overtone series.

12. The computer program product of claim 10, wherein the timbre analysis further comprises:
    for envelope description generation, using the FFT on the sound to compare amplitude to time to infer an Attack, Decay, Sustain, Release (ADSR) envelope of the sound.

13. The computer program product of claim 12, wherein the timbre analysis further comprises:
    for a fine timbre analysis, analysing a result of the FFT to find a filter sweep and an automation by comparing amplitude to time in the FFT.

14. A timbre creation system, the system comprising:
    a processor; and
    a memory, the memory storing instructions to cause the processor to perform:
        performing a timbre analysis of a sound from an input source to generate a digital fingerprint of the sound;
        performing deep learning to create a patch that matches the digital fingerprint; and
        generating a second patch for a second input source for a synthesizer which reproduces a timbre that complements the digital fingerprint based on the patch, the second input source being a different type of input than the input source.

15. The system of claim 14, wherein the timbre analysis further comprises using a fast-fourier transformation (FFT) to analyse an audible spectrum of the sound to determine a fundamental tone.

16. The system of claim 15, wherein the timbre analysis further comprises:

for a base timbre extraction, using FFT to analyze the audible spectrum to determine a base timbre for each fundamental tone.

17. The system of claim 16, wherein base timbres are determined by associating each fundamental tone with a unique overtone series.

18. The system of claim 16, wherein the timbre analysis further comprises:
for envelope description generation, using the FFT on the sound to compare amplitude to time to infer an Attack, Decay, Sustain, Release (ADSR) envelope of the sound.

19. The system of claim 18, wherein the timbre analysis further comprises:
for a fine timbre analysis, analysing a result of the FFT to find a filter sweep and an automation by comparing amplitude to time in the FFT.

20. The system of claim 14, embodied in a cloud-computing environment.

* * * * *